United States Patent [19]

Sathi

[11] Patent Number: 5,212,786
[45] Date of Patent: May 18, 1993

[54] FILE COMPACTION PROCESS FOR ELECTRONIC PRINTING SYSTEMS

[75] Inventor: Kitty Sathi, Pittsford, N.Y.

[73] Assignee: Xerox Corporation, Stamford, Conn.

[21] Appl. No.: 678,923

[22] Filed: Apr. 1, 1991

[51] Int. Cl.$^5$ ............................................. G06F 12/02
[52] U.S. Cl. .................... 395/600; 364/DIG. 1; 364/245.0; 364/246.0; 364/283.1; 364/222.81
[58] Field of Search ................. 364/DIG. 1; 395/600

[56]  References Cited
U.S. PATENT DOCUMENTS 5,021,946  6/1991  Korty ................................. 364/200
5,029,125  7/1991  Sciupac ............................. 364/900

*Primary Examiner*—Gareth D. Shaw
*Assistant Examiner*—A. Katbab
*Attorney, Agent, or Firm*—Frederick E. McMullen

[57]  ABSTRACT

A method is provided in which a volume allocation table (VAT) is constructed in a system memory on the basis of those files stored on a plurality of disks. In constructing the VAT of the system memory, contiguous (i.e., single run) files are first allocated to a first set of locations on the disks, and then non-contiguous (i.e., multiple run) files are allocated to a second set of locations on the disks. Upon building the VAT of the system memory, copies of it are written respectively to the disks so that the contiguous and non-contiguous files can be allocated to the first and second set of locations, respectively.

11 Claims, 19 Drawing Sheets

FILE COMPACTION PROCESS FOR ELECTRONIC PRINTING SYSTEMS

CROSS REFERENCES TO RELATED APPLICATIONS

The present application is related to the following co-pending applications, which are assigned to the same assignee as is the present application and incorporated by reference herein: U.S. patent application Ser. No. 07/678,924, filed Apr. 1, 1991 to Kitty Sathi et al to "Process For Upgrading Software In An Electronic Printing System"; U.S. patent application Ser. No. 07/678,925, filed Apr. 1, 1991 to Christopher Comparetta et al to "A Process For Replacing Storage Media In Electronic Printing Systems"; U.S. patent application Ser. No. 07/678,926, filed Apr. 1, 1991 to Kitty Sathi et al to "File Storage Process For Electronic Printing Systems Having Multiple Disks"; U.S. patent application Ser. No. 07/678,508, filed Apr. 1, 1991 to Robert J. Slomcenski et al to "File Updating Process For Electronic Printing Systems"; and U.S. patent application Ser. No. 07/678,091, filed Apr. 1, 1991 to Ronald A. Ippolito et al to "Process For Accommodating Bad Disk Pages In An Electronic Printing System".

The invention relates to electronic printers and printing systems, and more particularly, to a file compaction process for such systems.

An important task of the operating system in an electronic printing system is the maintenance of files which are permanent objects recorded on backing storage such as hard disks. A file consists of a sequence of pages, the contents of which must be preserved across system restarts. The file system provides the operating system with facilities for creating, organizing, reading, writing, modifying, copying, moving, deleting, and controlling access to the files.

However, during use files become scattered on the disks. To obviate this, compaction is required to restore contiguous disk space, compaction being used to move files to one end of the disk volume leaving a large contiguous free space at the other end of the disk volume. Where the files comprise both replicated and non-replicated files, a problem can arise if the system crashes while the disk volume is being compacted. In that event it is possible to lose both non-replicated files and even replicated files.

While it is known in the prior art to store the operating software for a reproduction machine on a hard disk, as shown in U.S. Pat. No. 4,937,864 to Caseiras et al, there is no disclosure, in an electronic printing system, to a process for compacting scattered replicated and non-replicated files stored on N disks to locate the files in one area of the disks and free the remaining area of the disks for storing new files and file updates, the replicated and non-replicated files including contiguous files having a single run and non-contiguous files having plural runs, and a first file allocation table identifying the current location of the files on the disks, comprising the steps of: building a list of the files stored on the disks; sorting the files in the list in accordance with the location of the files on the disks; building a second file allocation table; allocating new locations to the contiguous files in the one area of the disks in the second allocation table; allocating new locations to the non-contiguous files in the one area of the disks in the second allocation table; moving the contiguous and non-contiguous files to the new locations allocated for the files in the second allocation table while updating the first allocation table from the second allocation table; and erasing the second allocation table.

IN THE DRAWINGS

Figure 1:
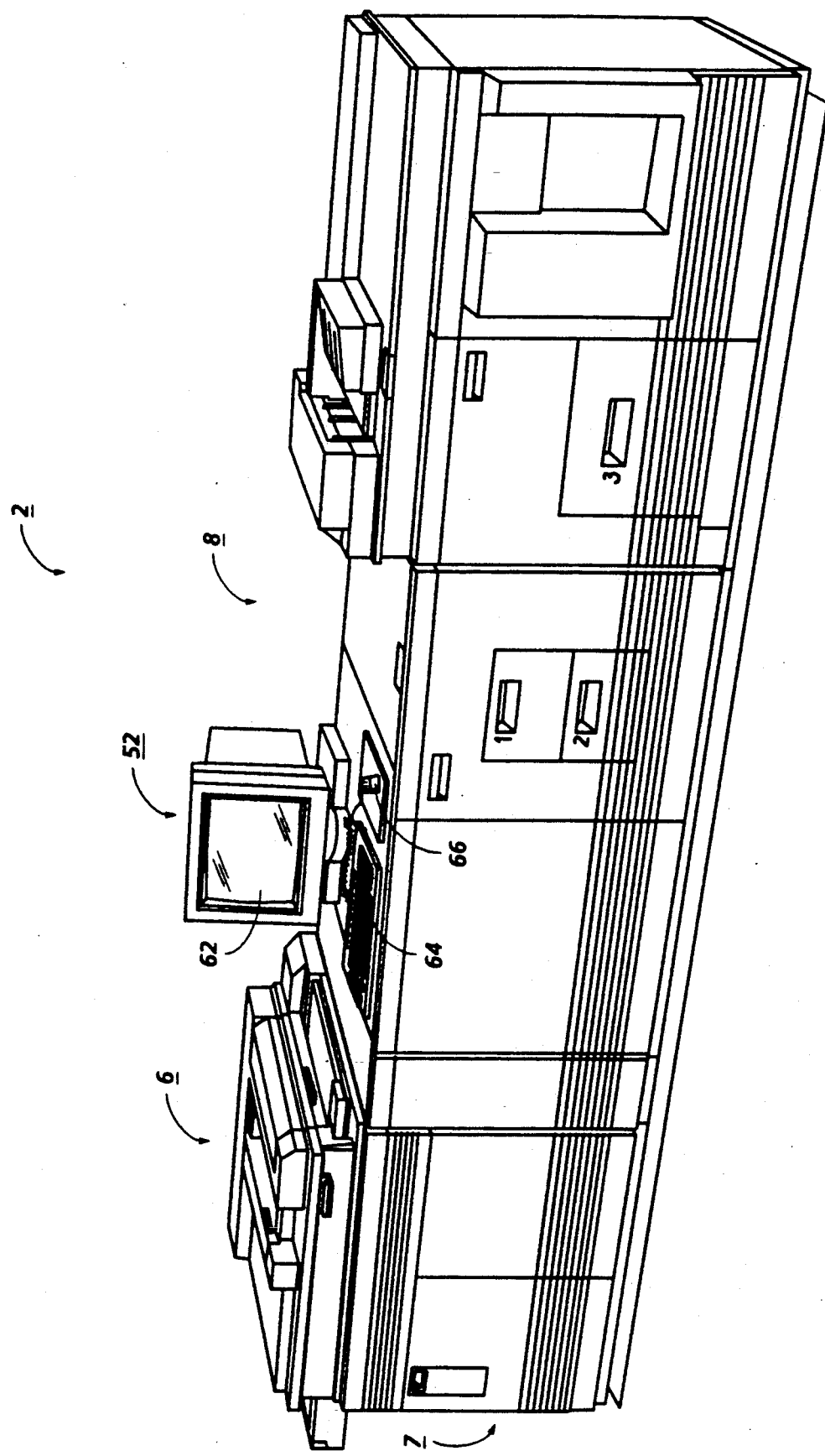
FIG. 1 is a view depicting an electronic printing system incorporating the file compaction process of the present invention.
Figure 3A:
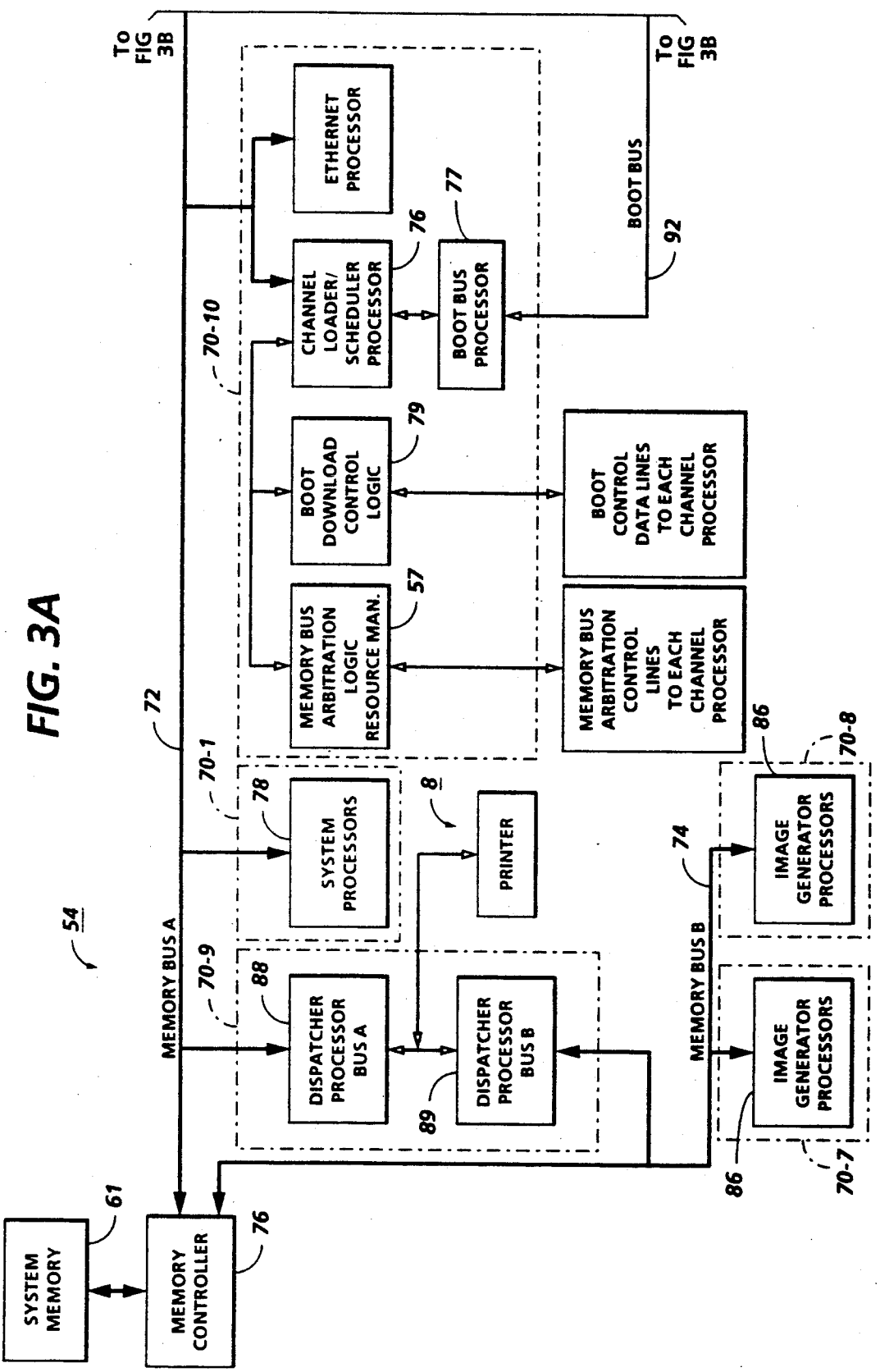
Figure 3B:
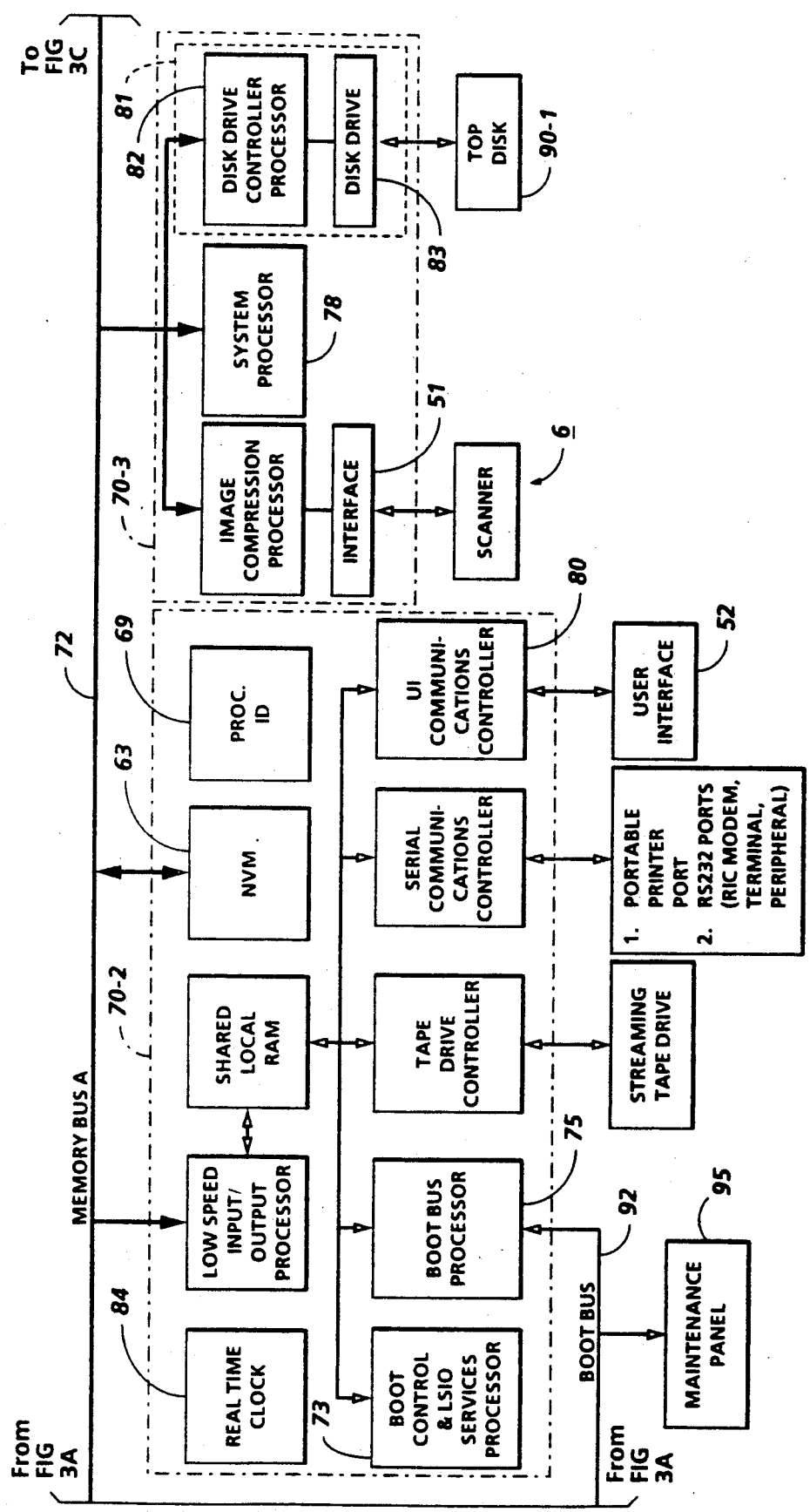
Figure 3C:
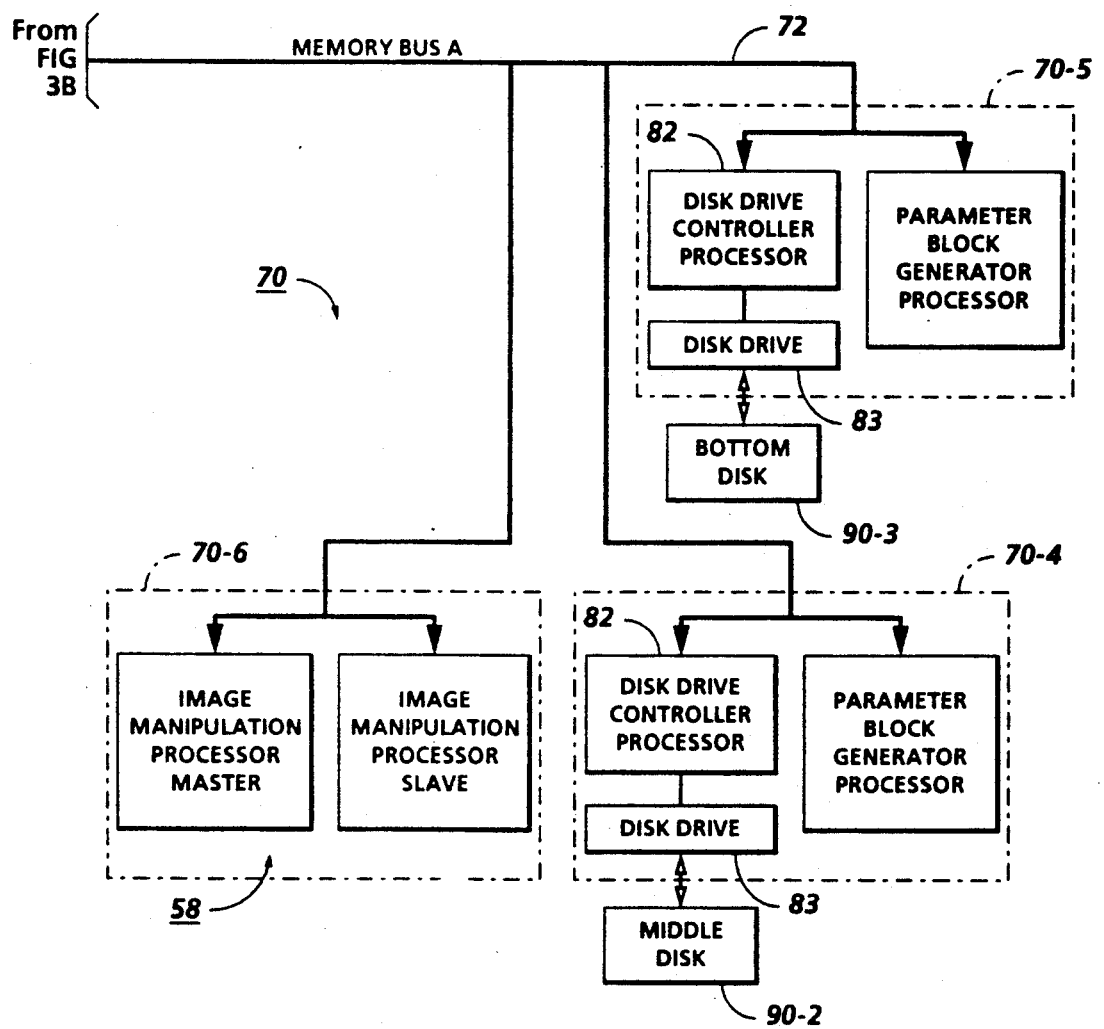
Figure 4:
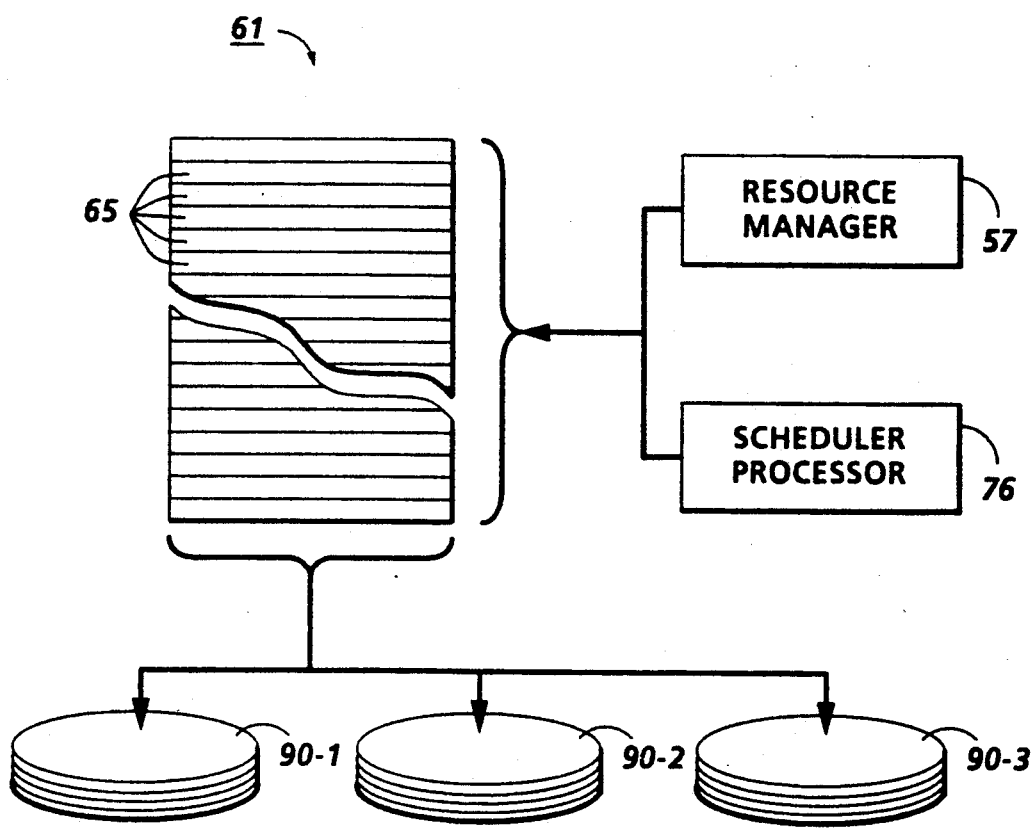
Figure 5:
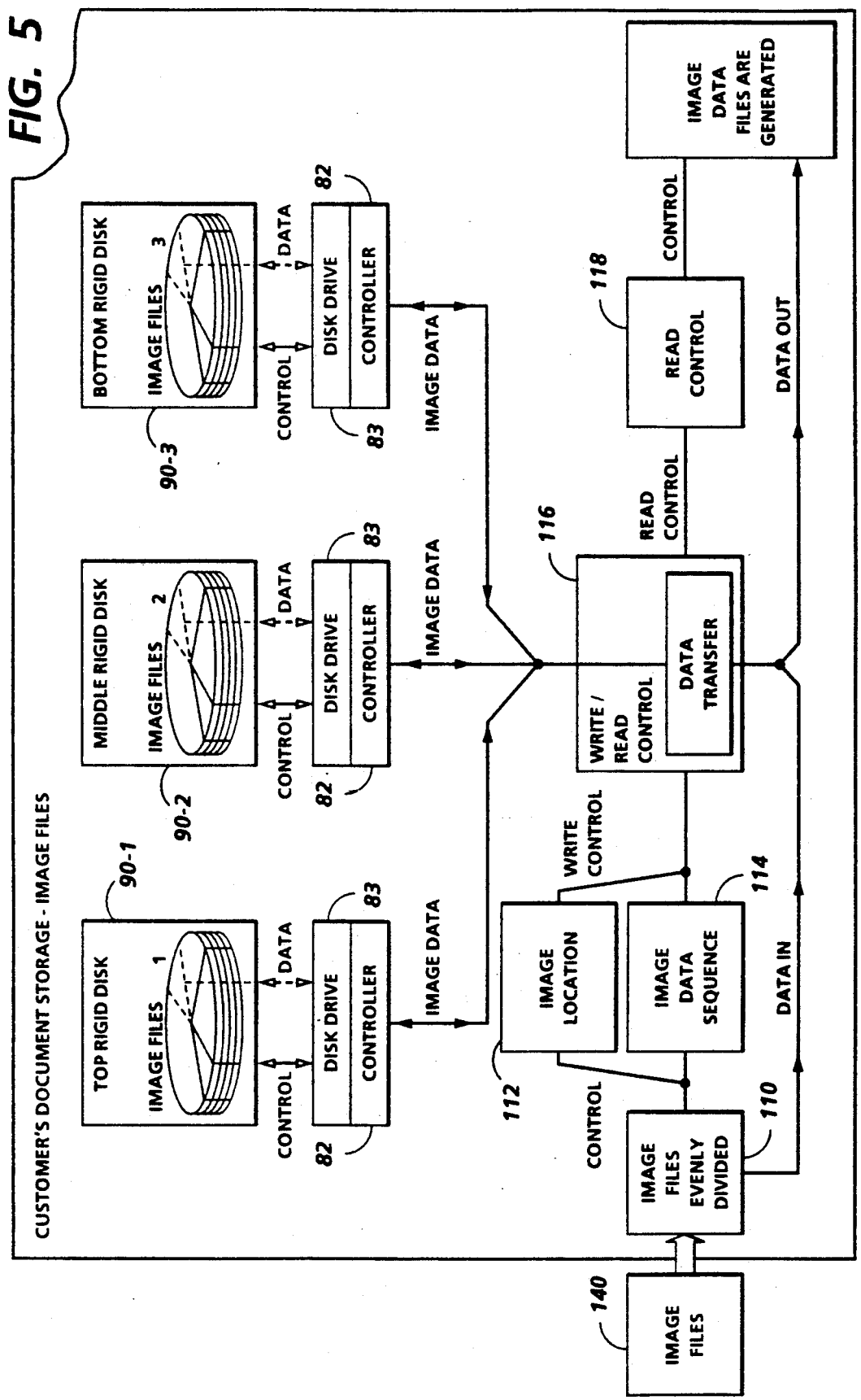
Figure 6:
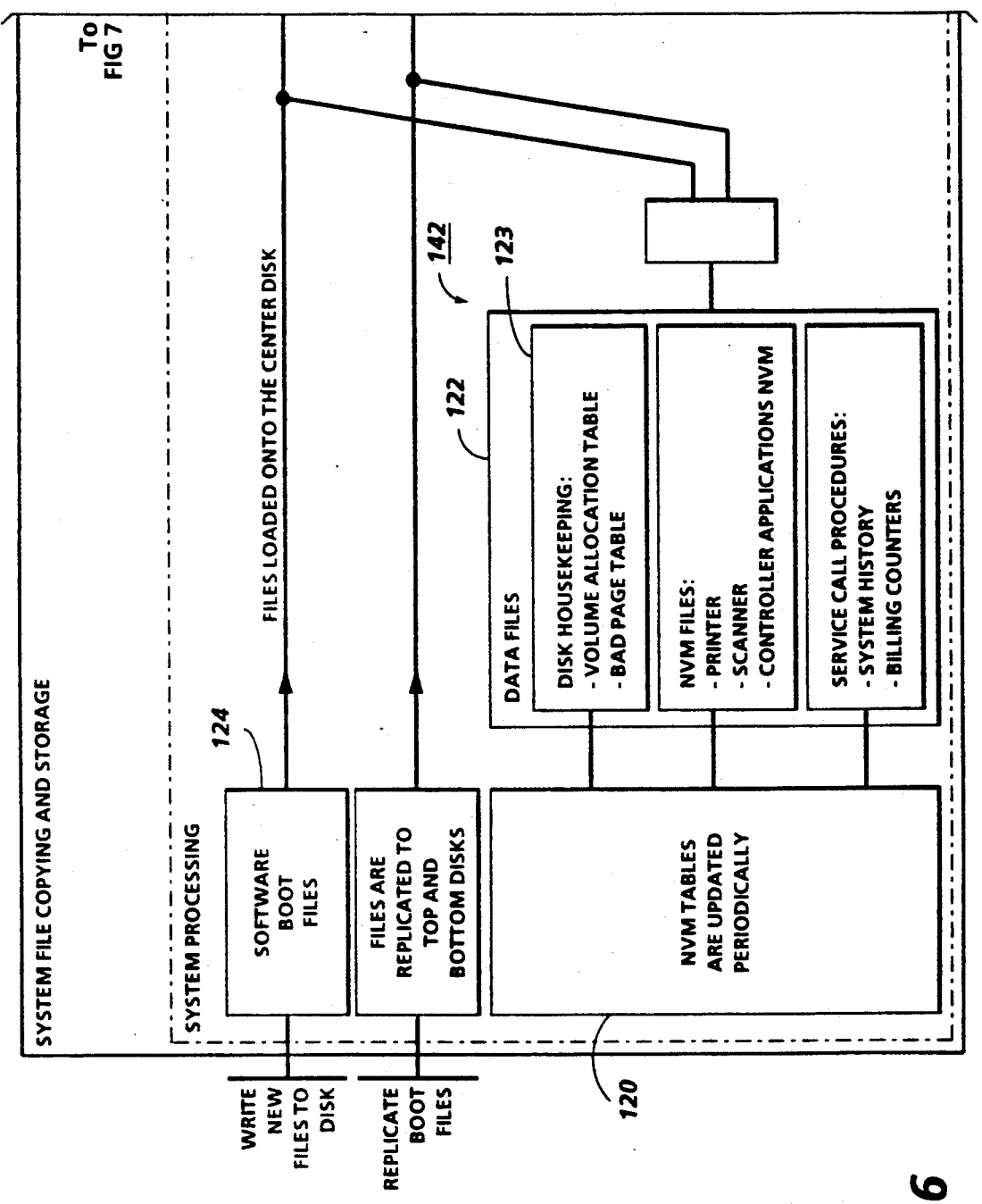
Figure 7:
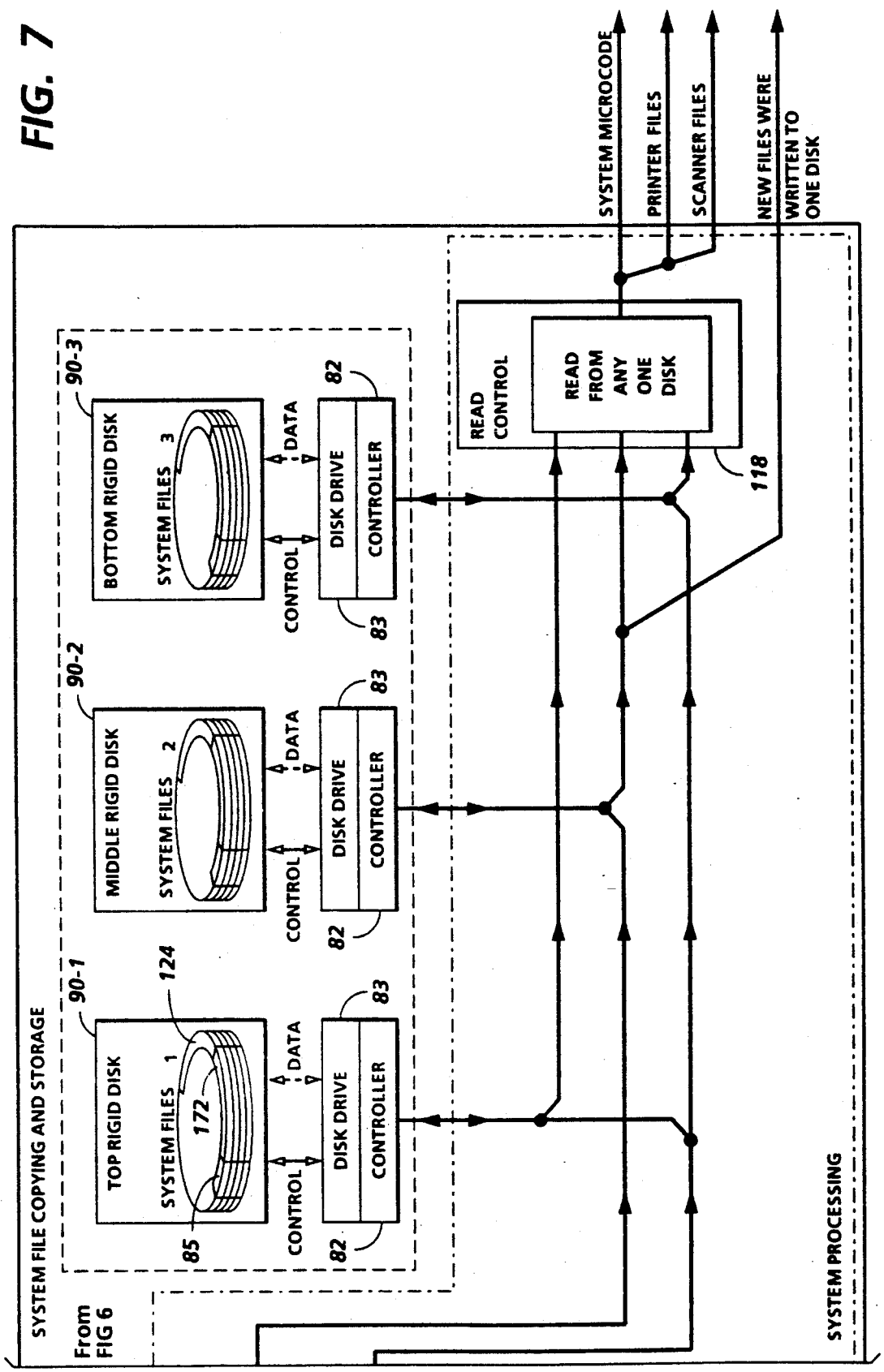
Figure 8:
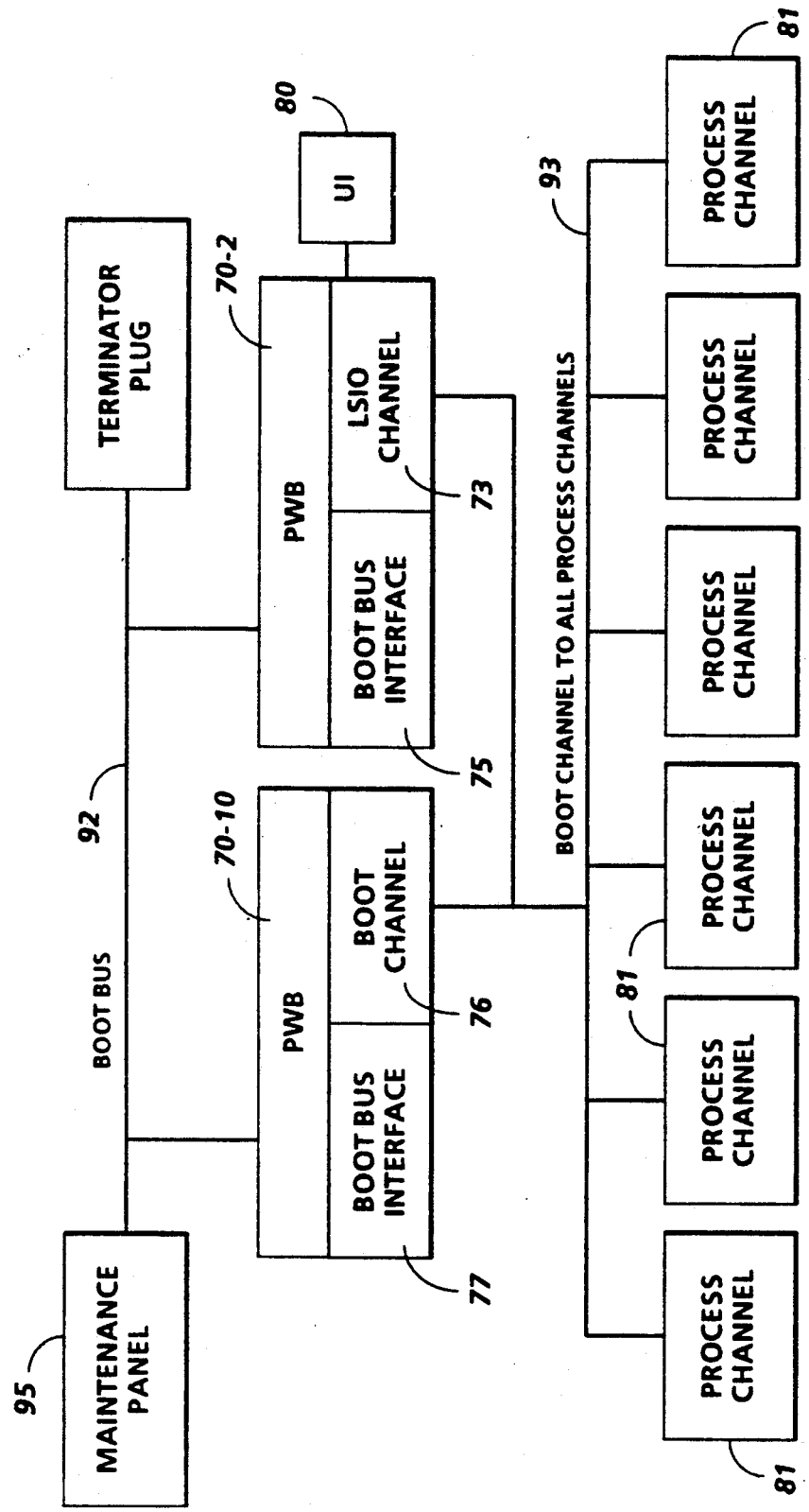
Figure 9:
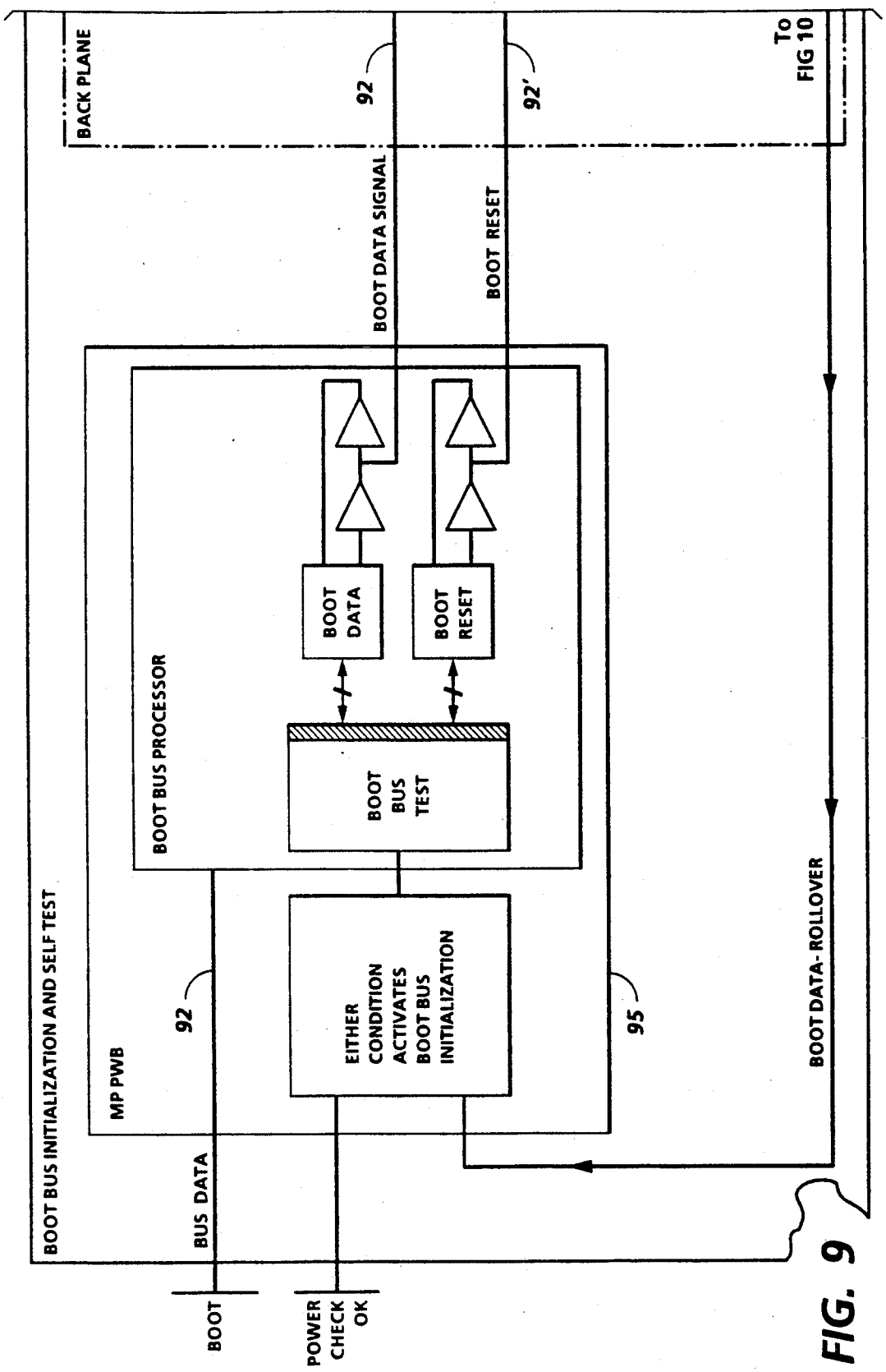
Figure 10:
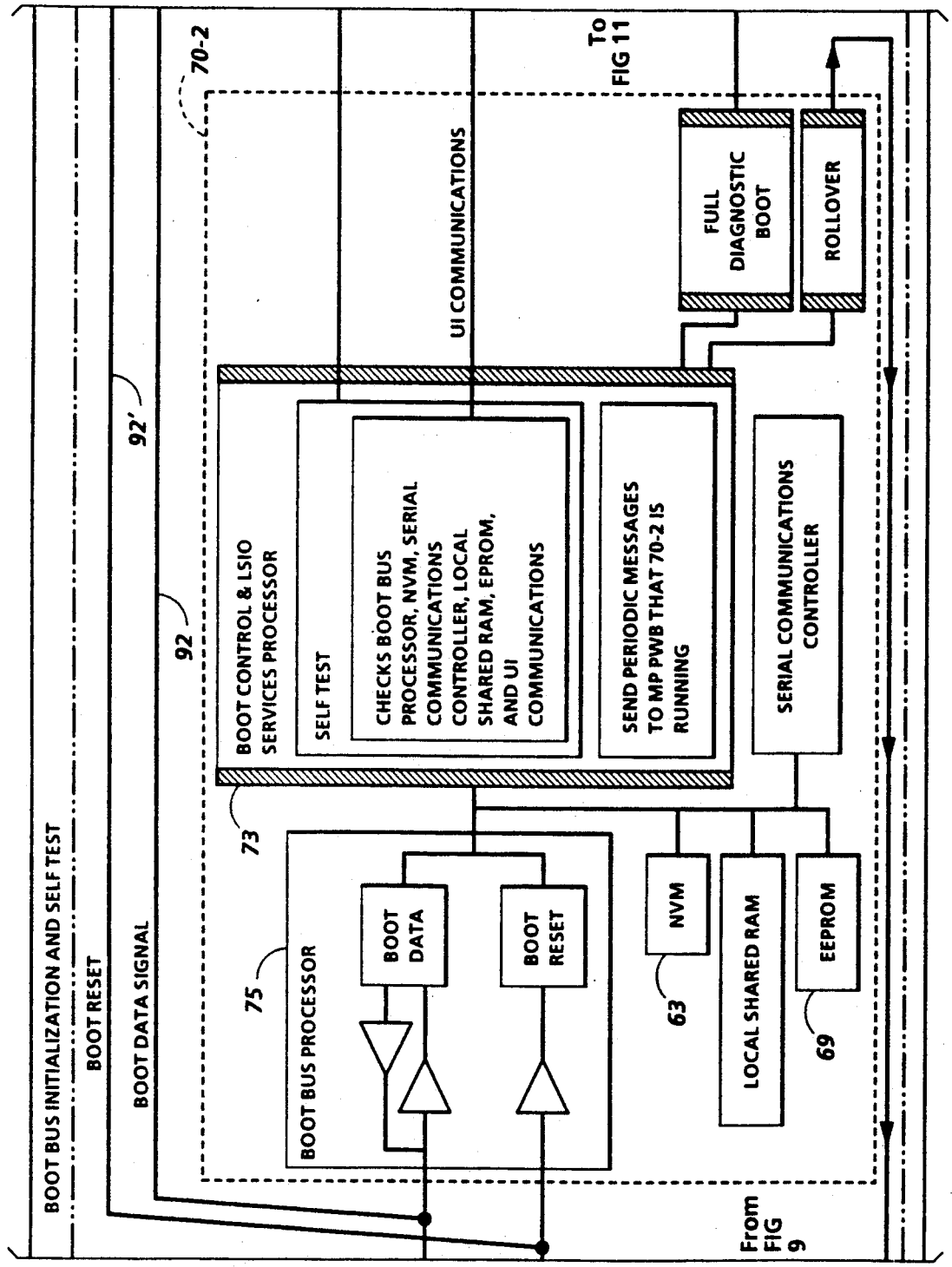
Figure 11:
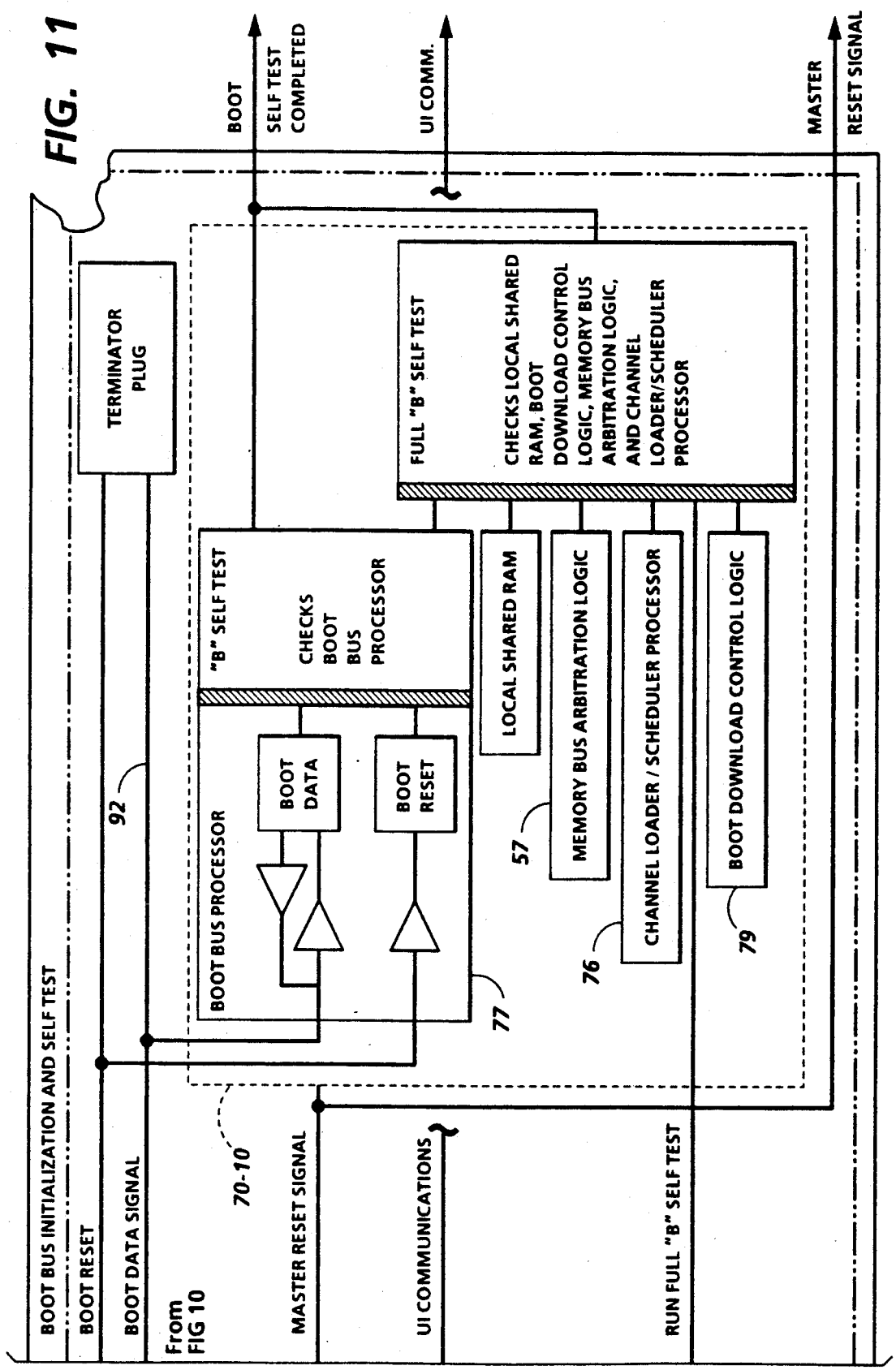
Figure 12:
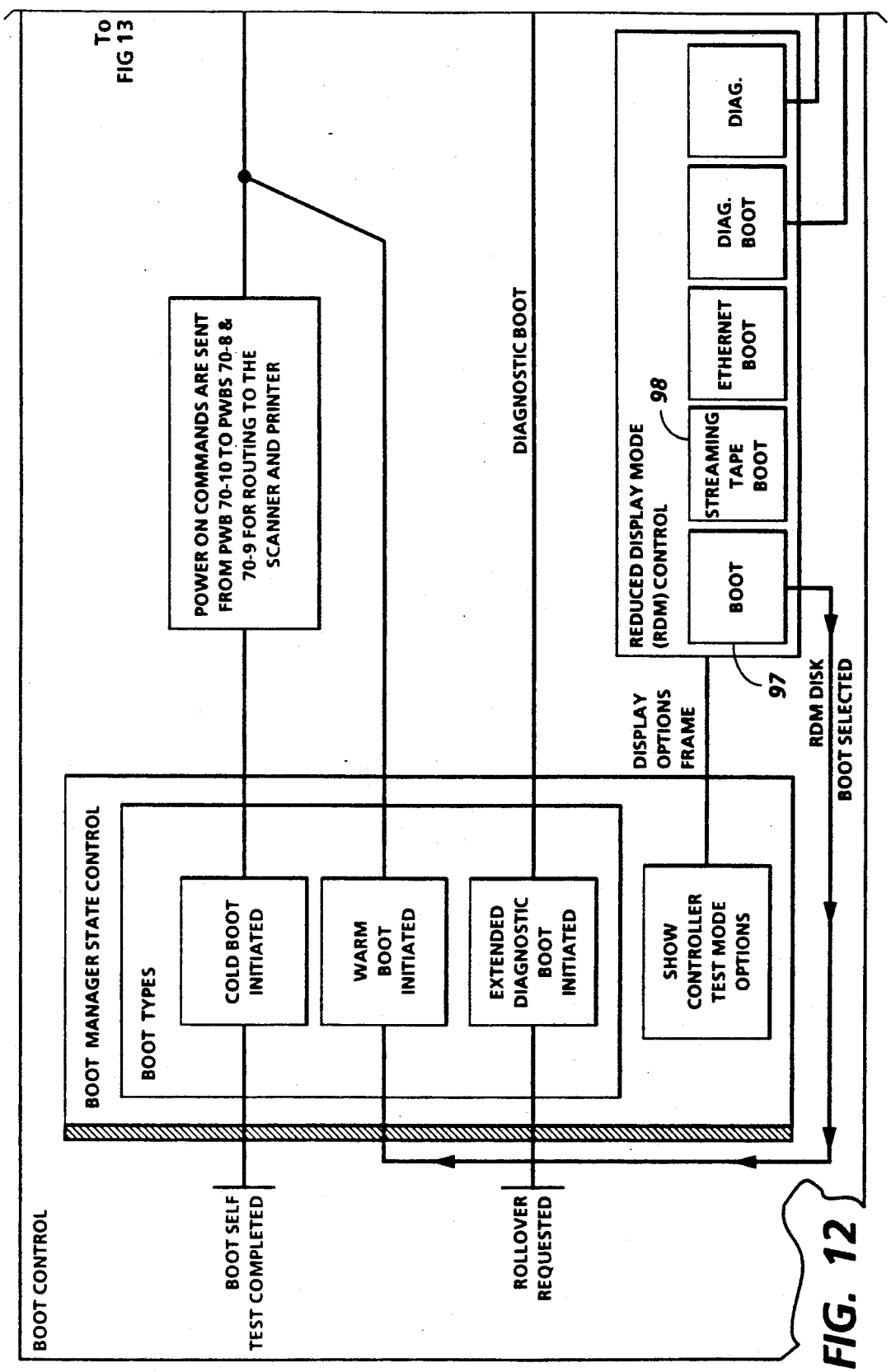
Figure 13:
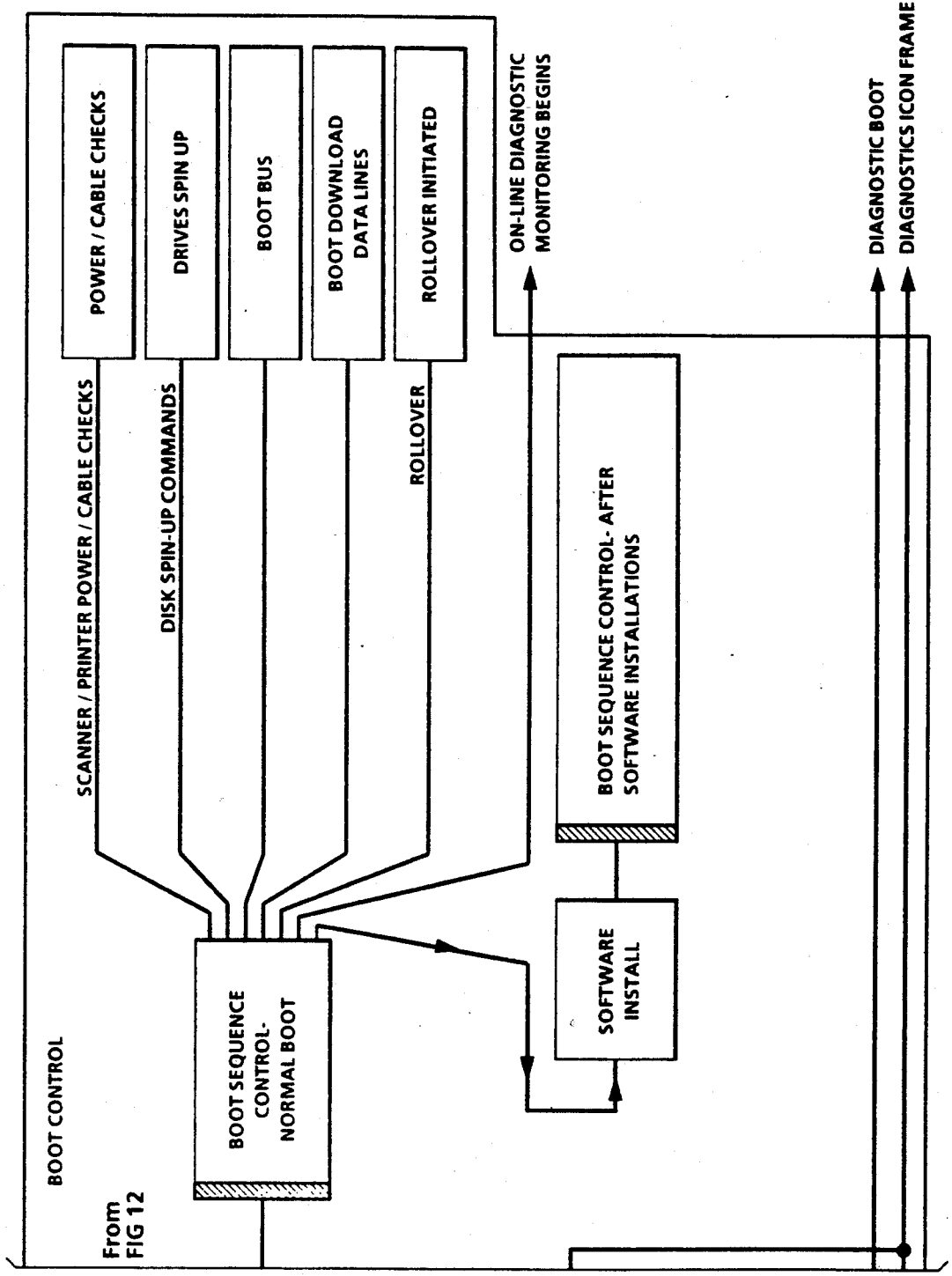
Figure 14:
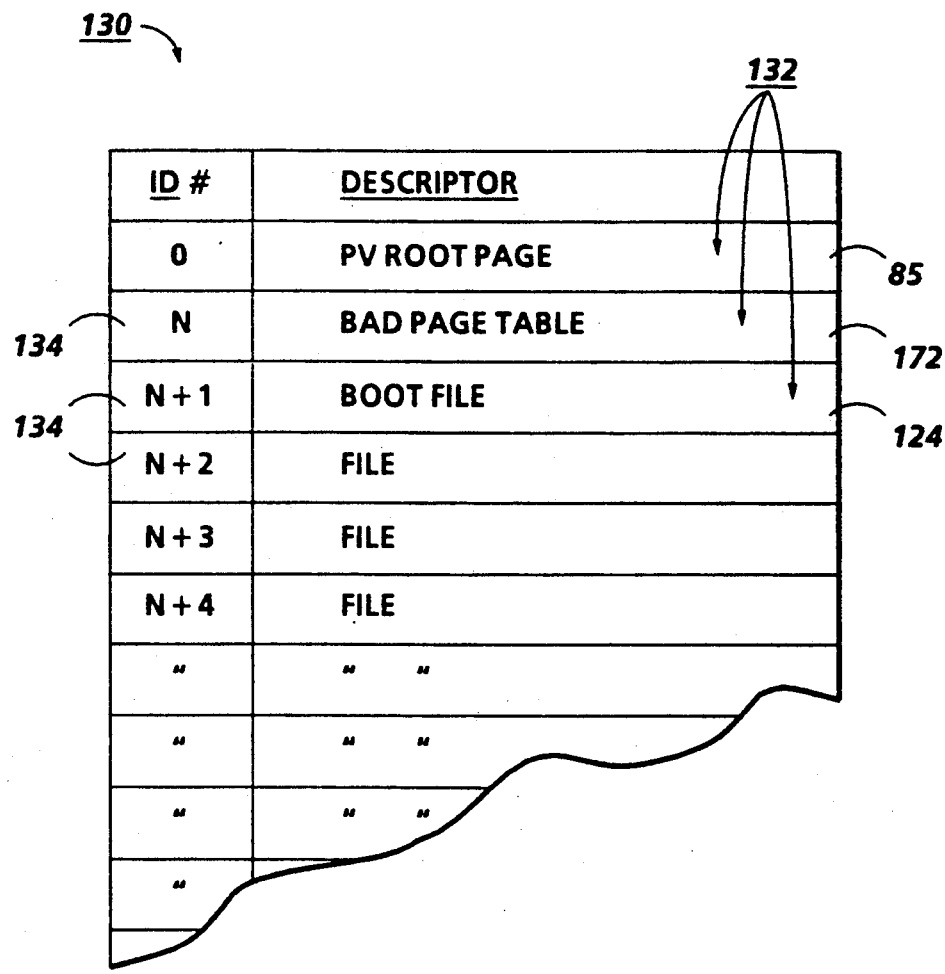
Figure 15:
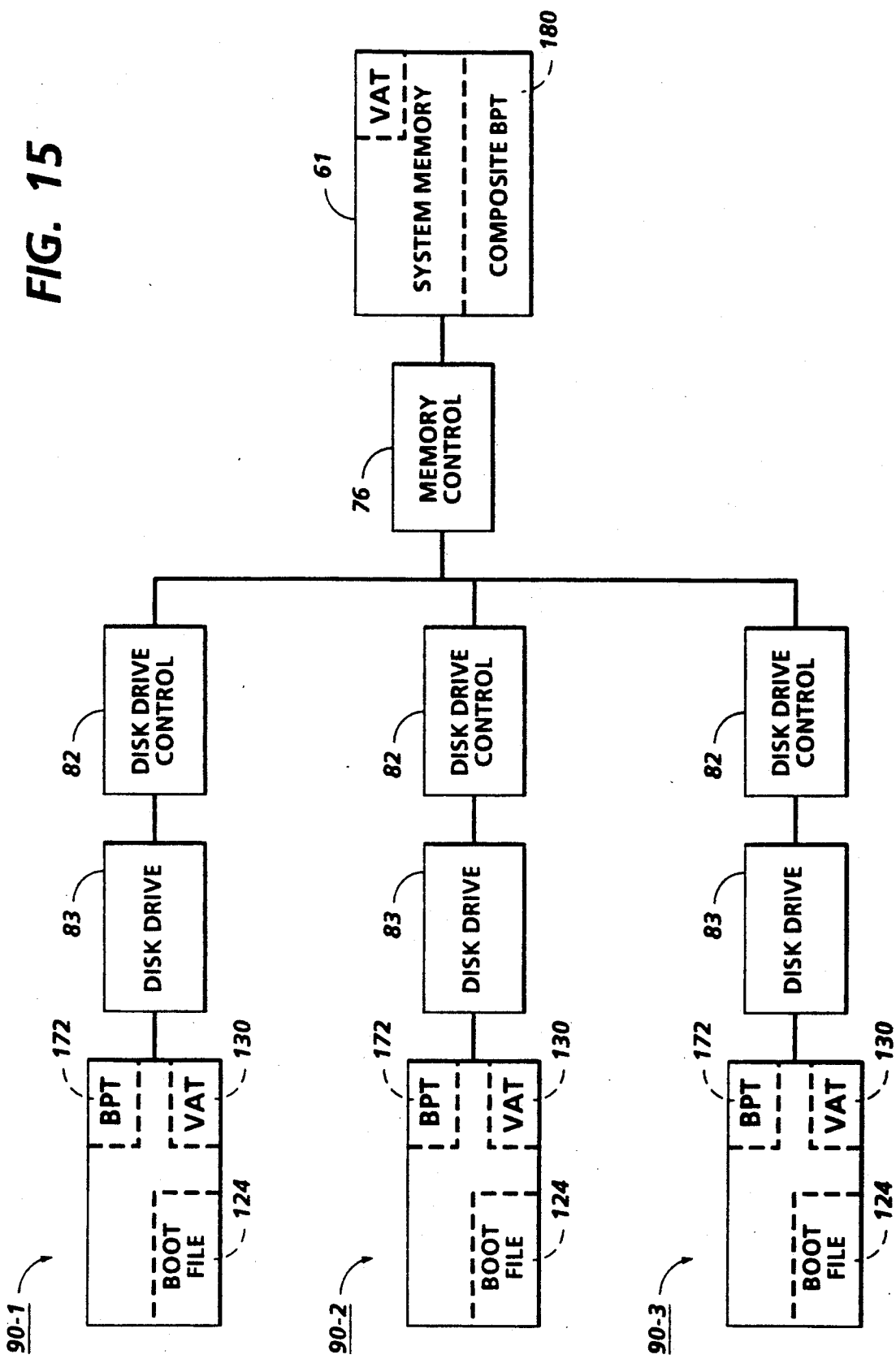
Figure 16:
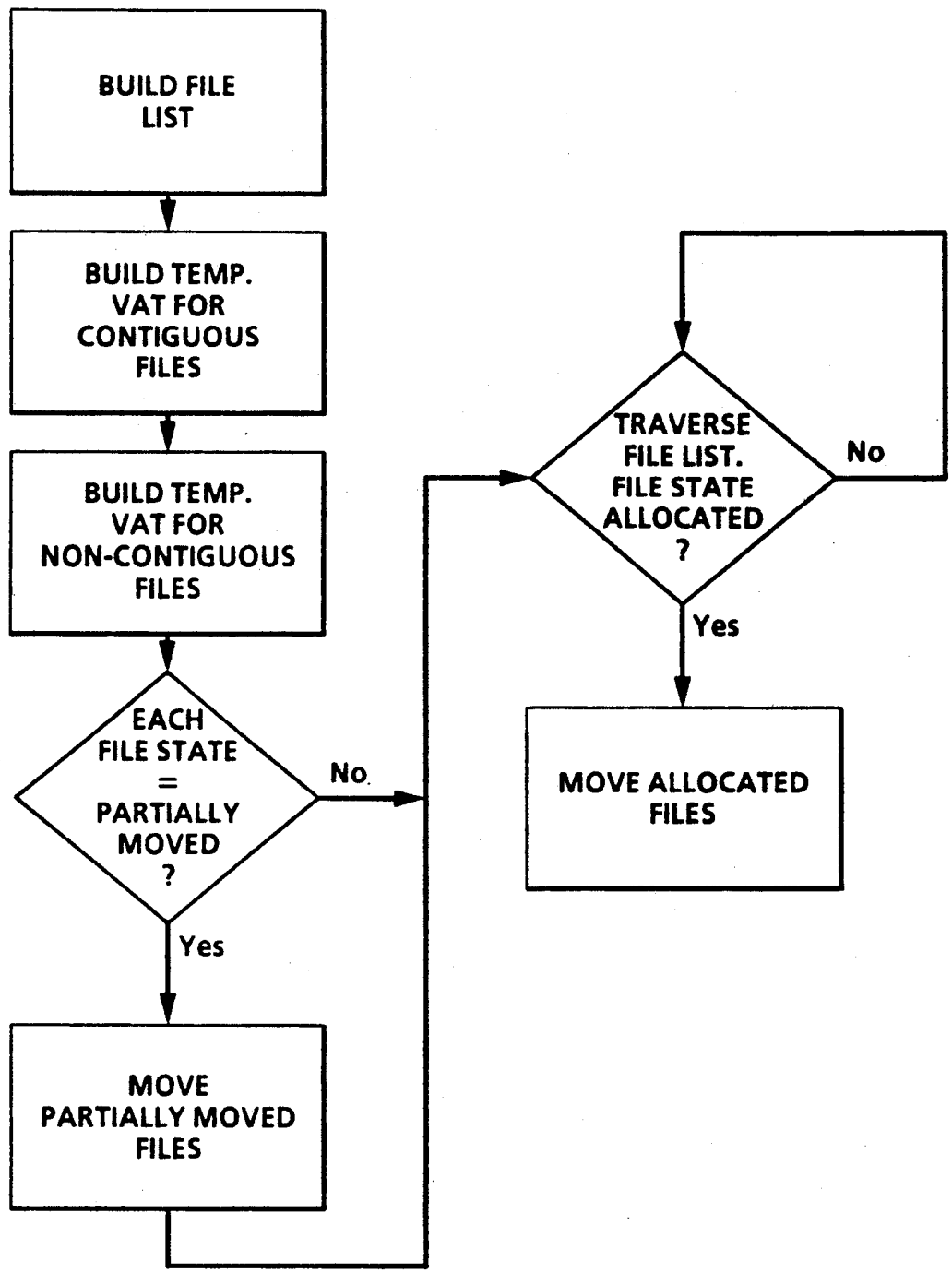
Figure 17:
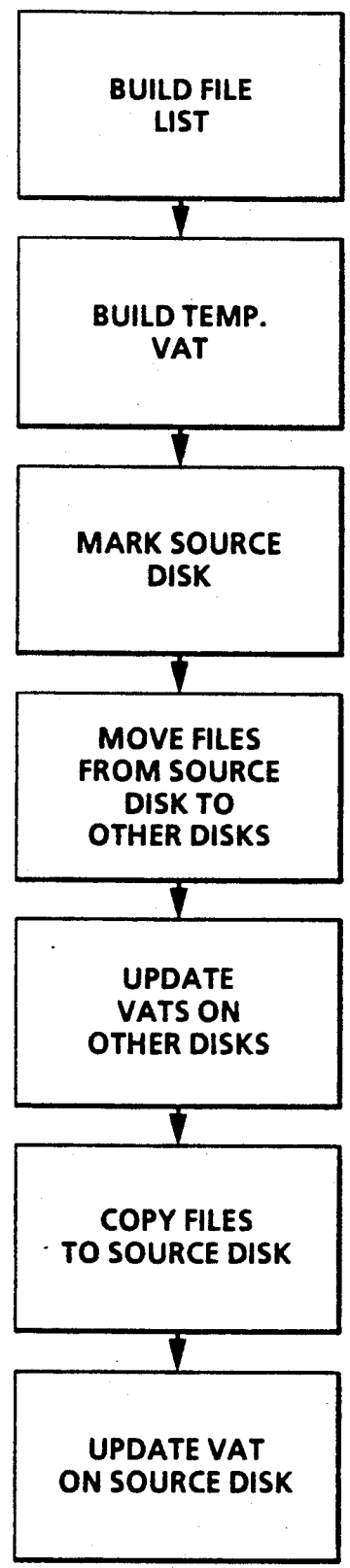

FIGS. 3A, 3B, and 3C comprise a schematic block diagram showing the major parts of the control section for the printing system shown in FIG. 1;

FIG. 4 is a block diagram depicting the process for transferring data from temporary RAM memory to hard disks;

FIG. 5 is a block diagram depicting the process for storing image files on disks to provide super disk files;

FIG. 6 is a block diagram depicting the process for collecting system files for storage on disks;

FIG. 7 is a block diagram depicting the process for replicating system files collected from FIG. 6 on disks;

FIG. 8 is a block diagram showing the boot system for booting the printing system depicted in FIG. 1 to an operating state;

FIG. 9 is a block diagram showing the boot initializing and self-testing carried out during booting;

FIG. 10 is a block diagram showing the process for initializing the system boot control and LSIO services processor during booting;

FIG. 11 is a block diagram showing the process for initializing the system channel loader/scheduler processor, boot download control logic, and memory bus arbitration logic during booting;

FIG. 12 is a block diagram depicting cold and warm boot implementations;

FIG. 13 is a block diagram depicting disk spin-up and software downloading processes during booting;

FIG. 14 is a schematic view depicting a Volume Allocation Table or VAT;

FIG. 15 is a block diagram showing the relationship between the disk storage media and system memory;

FIG. 16 is a flow chart showing the process for volume compaction of both super disk and replicated files; and FIG. 17 is a flow chart showing the process for volume compaction of replicated files.

DETAILED DESCRIPTION OF THE PREFERRED EMBODIMENTS

Figure 2:
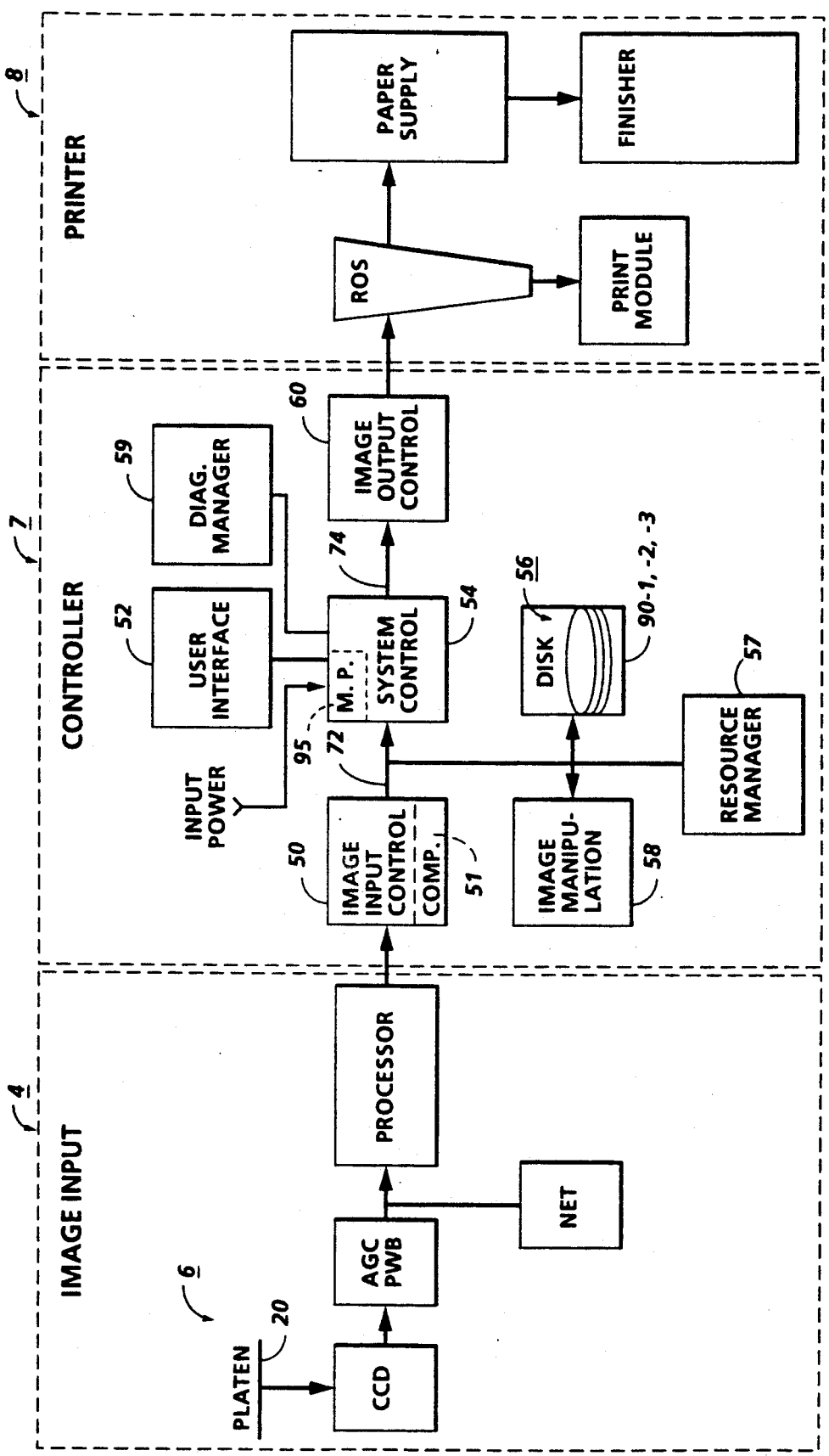
FIG. 2 is a block diagram depicting the major control system elements of the printing system shown in FIG. 1.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc. or else other image scanning/processing/recording systems, or else other signal transmitting/receiving, recording systems, etc. as well.

A more detailed description of printing system 2 may be found in copending U.S. patent application Ser. No. 07/620,519, filed Nov. 30, 1990, to James R. Graves et al, and entitled "System for Scanning Signature Pages", the disclosure of which is incorporated by reference herein.

Referring to FIG. 2, controller section 7 is, for explanation purposes, divided into an image input controller 50, User Interface (UI) 52, system controller 54, disk memory 56, image manipulation section 58, Resource Manager 57, Diagnostic Manager 59, and image output controller 60.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point a cursor to the item selected and keying the mouse.

Referring to FIGS. 2 and 3A–3C, the scanned image data input from scanner section 6 to controller section 7 is compressed by image compressor/processor 51 of image input controller 50 on Printed Wiring Board (PWB) 70-3. The compressed image data with related image descriptors are placed in image files and temporarily stored in system memory 61 pending transfer to main memory 56 where the data is held pending use.

When the compressed image data in memory 56 requires further processing, or is required for display on touchscreen 62 of UI 52, or is required by printer section 8, the data is accessed in memory 56 and transferred to system memory (RAM) 61. Where further processing other than that provided by processor 25 is required, the data is transferred to image manipulation section 58 on PWB 70-6 where additional processing steps such as collation, make ready (document editing), decomposition, rotation, etc. are carried out. Following processing, the data may be returned to main memory 56, sent to UI 52 for display on touchscreen 62, or sent to image output controller 60.

Resource Manager 57 controls access to disks 90-1, 90-2, 90-3 and RAM 61 of files while diagnostic manager 59 handles system faults.

Image data output to image output controller 60 is decompressed and readied for printing and output to printer section 8. Image data sent to printer section 8 for printing is normally purged from memory 56 to make room for new image data.

As shown in FIGS. 3A–3C, controller section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural application or system processors 78; low speed I/O processor PWB 70-2 having UI communication controller 80 for transmitting data to and from UI 52, Boot Control & LSIO Services Processor 73, and Boot Bus Processor 75; PWBs 70-3, 70-4, 70-5 having disk drive controller/processors 82 with disk drives 83 for transmitting data to and from disks 90-1, 90-2, 90-3 respectively of main memory 56 (image compressor/processor 51 for compressing the image data and another application processor 78 are on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10 having Channel Loader/Scheduler Processor 76, Boot Bus Processor 77, Boot Download Control Logic 79, and Memory Bus Arbitration Logic/Resource Manager 57. As will appear, Loader/Scheduler Processor 76 has two functions, one as a Boot channel to bring the system to the ready state and the other as a scheduler channel used to decide which channel performs which task and in which sequence the tasks will be performed.

Each independent processor and associated circuitry form a channel 81. Channels 81 (an example is shown in FIG. 3B) are independent processors for handling the applications software, or input/output processors for handling peripheral devices such as disk drives. For example, there are disk channels used to interface disk drives 83 for disks 90-1, 90-2, 90-3, scanner interface channel, printer interface channel, etc.

Main memory 56 has plural hard disks 90-1, 90-2, 90-3 on which image files 140 (seen in FIG. 5) and system files 142 (seen in FIG. 6) are stored. System files comprise system operating files such as boot files 124, software files, data files 122, etc., while image files are typically files of scanned image data.

System memory 61, which comprises a Random Access Memory or RAM, serves as a temporary store for data required during system operations. Memory 61 stores bits of data which can be written to (Data Entered) or read from (Data Used) from the memory. Other data in memory 61 is used for reference and remains loaded as long as power is supplied. Since memory 61 is volatile, that is, all data is lost when power to memory 61 is terminated, Non-Volatile Memory (NVM), which essentially comprise RAM memory with battery backup to supply DC voltage when power is turned off, are provided at several locations in the system as, for example, NVM 63 on Low Speed I/O Processor PWB 70-2 (FIG. 3B). NVM 63 is used to store file management updates and file content updates.

Referring now to FIG. 4, Resource Manager 57 schedules access to disks 90-1, 90-2, 90-3 for clients. Data to be transferred to disks 90-1, 90-2, 90-3 is held in system memory 61 which is managed as a chain of buffers 65 by Resource Manager 57. For this, buffers 65 assigned to the clients are handed to Resource Manager 57 and then written to the disk 90-1, 90-2, 90-3 whenever disk bandwidth is available. However, each seek incurs a seek overhead. To minimize the number of seeks when a client is updating files, buffers 65 are chained together and written out to the disks as one operation. Resource Manager 57 links together buffers 65 that are to be written to contiguous locations on disks 90-1, 90-2, 90-3, writing being in response to attaining a preset threshold.

As described in copending U.S. patent application Ser. No. 07/590,634, filed Sep. 28, 1990 now abandoned and refiled under FWC on Oct. 15, 1992 with Ser. No. 07/962,166, to George L. Eldridge, and entitled "Method of Operating Disk Drives in Parallel", and copending U.S. patent application Ser. No. 07/678,992, filed Apr. 1, 1991, 1990 now abandoned and refiled under FWC on May 13, 1992 with Ser. No. 07/869,075 to Mark A. Smith et al, and entitled "Process For Replacing Non-Volatile Memory in Electronic Printing Systems" the disclosures of which are incorporated by reference herein, image files 140 are divided equally into sectors, with successive sectors of the files spread equally across disks 90-1, 90-2, 90-3. This process (called Super Disk herein), allows faster read/write transfer since all three disks can be accessed simultaneously. The risk incurred in this type of arrangement, however, is the loss of parts of a file. This effectively results in loss of the entire file should one or more of the disks fail.

System files 142 are normally permanent files which must be maintained. To assure retention, system files are replicated on each of the disks 90-1, 90-2, 90-3 at the same address. Replicated files are written simultaneously to all three disks 90-1, 90-2, 90-3, with the disk heads in the same position.

As a result, both super disk files (i.e., image files that are distributed equally on each disk 90-1, 90-2, 90-3 of the system) and replicated files (i.e., duplicate system files on each disk 90-1, 90-2, 90-3) are created. When super disk files are accessed, all disks 90-1, 90-2, 90-3 are busy retrieving/storing data from/to disks. When a copy of a replicated file is accessed for reading, only one disk is busy. Since reading a file from a single disk takes longer than accessing a super disk file, Channel Loader/Scheduler Processor 76 schedules single disk access to all disks 90-1, 90-2, 90-3 in parallel, allowing the system to retrieve more than one file at a time.

Referring to FIG. 5, image files 140 to be transferred to disks 90-1, 90-2, 90-3 are evenly divided among the three disks by divider logic 110, with transfer to disks 90-1, 90-2, 90-3 controlled by image location logic 112, image data sequence logic 114, and write/read control logic 116 of disk drive controller processor 82. Divider logic 110 divides the image files evenly between the disk drives 83 for disks 90-1, 90-2, 90-3 to form one larger storage media or super disk. Image location logic 112 designates the location sectors for each image file on disk drives 90-1, 90-2, 90-3. Image data sequence logic 114 controls the disk writing sequence. In the arrangement shown, the first image file segment is written to disk 90-1, the second image file segment to disk 90-2, the third image file segment to disk 90-3, the fourth image file segment to disk 90-1, and so forth until all the image file data has been written. Write/read control logic 116 provides the actual instructions to write or read image data to or from disks 90-1, 90-2, 90-3. Image data read from disks 90-1, 90-2, 90-3 is reconstructed by read control logic 118 which reads the image file segments back from disks 90-1, 90-2, 90-3 in the same manner as the data was written to disks 90-1, 90-2, 90-3.

Referring to FIGS. 6 and 7, system files 142, such as updates 120 of data files 122 that occur periodically during operation and life of the system 2, files such as new or upgraded software that are entered, etc., are loaded onto center disk 90-2 through Disk Drive Control Processor 83 for disk 90-2. The system files are replicated on top and bottom disks 90-1, 90-3. Read control 118 reads system files from any one of the disks 90-1, 90-2, 90-3.

Processor identification seals, which comprise, for example, a 12 byte quantity having a 6 byte time stamp read from the system real time clock 84 (seen in FIG. 3B) and a 6 byte processor identification (PROC ID), are provided. The PROC ID is kept on a chip 69 socketed onto PWB 70-2 (seen in FIG. 3B) and remains with the machine in the event PWB 70-2 is replaced. A copy of the processor ID and initialized time stamp is stored in system NVM 63 on PWB 70-2 (seen in FIG. 3B). On each disk 90-1, 90-2, 90-3, the disk Physical Volume Root Page 85 (PV Root Page-seen in FIGS. 7 and 14), which includes a PV Root Page seal comprising the PROC ID seal plus the position of the disk in the super disk setup, is stored at page zero.

With the identification seals described above, replacement of one of the disks 90-1, 90-2, 90-3 or PWB 70-2 can be determined. Further, the identification seals enable switching or swapping of the disks with one another to be detected.

Referring to FIGS. 3A, 3B, and 7-14 and TABLE I, a boot file 124 is replicated on each of the disks 90-1, 90-2, 90-3 for booting system 2. In order to disk boot system 2, the boot software loads the necessary files from the boot disk into memory and enables execution of the software. Since the boot file is replicated on all disks 90-1, 90-2, 90-3, the system can boot from any disk and inform the operator when one disk is not available.

As will be understood, it is necessary to boot the system when power is first switched on (Cold Boot initiated) or when necessary during system operation (Warm Boot initiated). For the later, a manual 'Boot' button 97 (seen in FIG. 12) is provided. For Cold Boot, the system processors 78, except for a maintenance panel 95, are in a reset state. On power up, maintenance panel 95 checks to determine if power input is correct, and if so, releases reset lines 92' contained in a Boot Bus 92. Boot Bus 92 is coupled to Boot & LSIO service processor 73 and UI communication controller 80 on PWB 70-2 through boot bus processor 75, and to channel Loader/Scheduler processor 76 on PWB 70-10 through boot bus processor 77. The reset lines release processors 76 and 73 and UI communication controller 80, allowing Boot Bus 92 during the boot sequence to transmit software programs from PWB 70-2 to processor 76 on PWB 70-10 for downloading to each processor channel 81. Once communications are established, Boot Channel 93 initializes all channels 81 to enable downloading of the micro code instructions by channel Loader/Scheduler processor 76 as described in TABLE I.

Whenever the system is booted, the PROC ID stored in chip 69 is read and compared with the PROC ID from the SysNVM Seal and the SysNVM Seal compared with the PV Boot Page Seal to determine if PWB 70-2 is defective or if any disk has been replaced. The PROC ID is compared with the PV Root Page Proc. ID to see if the booting disk was replaced.

When the boot file 124 cannot be read off the specified boot disk, the disk number is incremented and the booting process continues using a second disk. If the second disk is found to be unavailable, booting from the third disk is tried. Where booting cannot be made from any disk following a preset number of tries, the system returns to a service dialogue routine in Diagnostic Manager 56, requiring servicing by the Tech Rep and booting of the system through the use of streaming tape using streaming tape boot button 98 (seen in FIG. 12).

Referring to FIGS. 7, 14 and 15, to keep track of space or volume on disks 90-1, 90-2, 90-3, a file system is used to maintain a record of space allocated to each image and system file 140, 142 on disks 90-1, 90-2, 90-3. For this, the file system maintains a Volume Allocation Table (hereinafter referred to as VAT) 130 for each logical disk volume. VAT 130 keeps a record of available disk space and a list of the file descriptors 132 for every file 140, 142 on that volume. Each file 140, 142 has a unique ID consisting of an index or page 134 which is offset into VAT 130 and file descriptor 132. File descriptors 132 contain information concerning the physical location of the file on the disk and the physical characteristics of the file. Descriptors 132 may be linked together when a file spans multiple runs of a disk. (A run describes the contiguous extents that comprise a file and consists of a start address of the run with respect to the volume, and run length.) There is a common VAT 130 for all three disks 90-1, 90-2, 90-3. A copy of the VAT 130 is stored on each disk.

Disks such as 90-1, 90-2, 90-3 normally have flawed or bad pages that are defective and hence cannot be used. A bad page table (BPT) 172 having a list of bad pages 170 for each particular disk is stored on the disk at a known location.

Since the number and location of bad pages will vary from disk to disk, the file system marks the same page as inaccessible on each disk. When a system file 142 is allocated, the file system creates a run around the bad page. In the case of an image file 140, the file sectors are located so that bad pages on the disks are avoided. This avoids the need to break up individual sectors.

The disk Physical Volume Root Page 85 (PV Root Page) described above, which includes a PV Root Page seal and the position of the disk in the super disk setup, is stored at page zero on each disk.

Referring also to FIG. 16, to recover contiguous disk space and remove disk space fragmentation on disks 90-1, 90-2, 90-3, compaction is employed to move files to one end of the disk volume, leaving large contiguous free space at the other end of the volume. Disk housekeeping software 123 (FIG. 6) detects the need for compaction and notifies the operator who initiates the compaction process. However, there exists a danger of loss of files if during compaction the system crashes.

To obviate this, the system maintains state information which enables, on reboot following a crash, compaction to be restarted at the point where compaction was interrupted. Since the system has both super disk and replicated files, volume compaction for volume having both super disk and replicated files is different than compaction for volume having replicated files only, the latter normally occurring on disk replacement.

For both super disk and replicated files, volume compaction is effected by building a list of files on volume sorted in ascending order by disk addresses. Following this, an empty Volume Allocation Table (VAT) is temporarily built, and the PV Root page 85, and Bad Page Table 172 are marked. New locations are found and allocated for all contiguous (i.e., 1 run) files. Following this, new locations are found and allocated for all files with multiple runs, that is, non-contiguous files. Following allocation, the files are moved to the disk locations allocated for each file, while the disk VATs 130 are updated with the new file locations.

Moving of the files may, in the case where another file or partial file occupies an allocated area, require file swapping. That is, the file currently occupying the allocated space must be moved to another location to make room for the file newly allocated to that disk space. Swapping is further complicated where the files being swapped are not the same size. This may result, during the compaction process, in files being partially moved. To facilitate swapping, plural swap files (for example, two) are provided to temporarily hold the files being swapped during the file swapping process. This protects against loss of a file should the system crash during the swapping process.

When all the files marked allocated as described by the temporary VAT have been moved and the disk VATs 130 updated with the new file locations. The temporary VAT is erased.

Referring also to FIG. 17, whenever one or more disks 90-1, 90-2, 90-3 are replaced, super disk files, which are scattered among the disks, are lost, leaving only replicated files. Preferably, file compaction is run by the Tech Rep at this time to move the system files which remain to one end of the disk volume.

For this, a list of files on volume is built together with a temporary VAT allocating space for contiguous files and then non-contiguous files as described above. A disk is marked as a source disk. The allocated files are moved from the source disk to the remaining disks and the new locations defined by the temporary VAT, while the VATs 130 on the destination disks are updated to indicate the new addresses. After all of the files are moved, the files are copied to the source disk at the new addresses and the VAT 130 on the source disk updated to complete the process.

If a file is required for booting the system, the boot information (stored in the dedicated area of the disk) is updated to indicate the new location for the file on that disk automatically.

While the invention has been described with reference to the structure disclosed, it is not confined to the details set forth, but is intended to cover such modifications or changes as may come within the scope of the following claims.

TABLE I

Boot Sequence Control-Normal Boot

1. Power & cable connections are checked both to scanner 4 & printer 8

2. System memory 61 tested & initialized. Channel processor 81 perform reads & writes to various sections of memory 61

3. Disk controller microcode is downloaded to disk controller processors 82 via boot bus 92 & boot download control logic 79

4. If cold boot, spin-up commands sent to disk drives 83 (if warm boot, checks made to see if all disks 90-1, 90-2, 90-3 are spinning)

5. Channel loader microcode is sent via boot bus 92 to PWB 70-10. Microcode is then downloaded using boot download control logic 79 to channel loader/scheduler processor 76.

6. Channel loader/scheduler processor 76 requests that disk controller processor 82 retrieve the controller microcode file from disk 90-2. Disk controller processor 82 ships file to memory 61. Channel loader/scheduler processor 76 then downloads microcode to each channel 81 using boot download control logic.

7. Channel loader/scheduler processor 76 requests that disk controller processor 83 retrieve the application software loader program from disk 90-2. Disk controller processor 83 ships file to memory 61.

8. Scheduler microcode is downloaded into channel loader/scheduler processor 76. Processor 76 will now perform only as a scheduler processor.

9. Application software loader program is started. Application software is retrieved from disk 90-2 & stored in memory 61.

10. UI 52, scanner 4, & printer 8 software is downloaded.

I claim:

1. In an electronic printing system having a system memory operatively coupled with N disks, a processor for writing data, represented by electrical signals, from said memory to said disks, and means for controlling movement of scattered replicated and non-replicated files between said disks, a process for compacting said scattered replicated and non-replicated files stored on said disks to locate said files in one area of said disks and free the remaining area of said disks for storing new files and file updates, said replicated and non-replicated files including contiguous files having a single run and non-contiguous files having plural runs, and a first file allocation table, identifying the current location of said files on said disks, comprising the steps of:
   a) building a list of said contiguous and noncontiguous files stored on said disks;
   b) sorting said files in said list in accordance with the location of said files on said disks;
   c) building a second file allocation table in said system memory;
   d) allocating a first set of locations to said contiguous files in said one area of said disks in said second allocation table;
   e) allocating a second set of locations to said non-contiguous files in said one area of said disks in said second allocation table, performing step d) substantially prior to performing step e);
   f) writing a copy of said second allocation table to one of said disks with said processor to update said first allocation table;
   g) moving said contiguous and non-contiguous files to the respective first and second locations allocated for said files in said second allocation table with said controlling means; and
   h) erasing said second allocation table from said system memory.

2. The process according to claim 1 including the step of:
   allocating said non-contiguous files so that said non-contiguous file runs are combined to change said non-contiguous files to contiguous files.

3. The process according to claim 1 including the step of:
   moving said files by swapping files currently in said one area of said disks with files allocated to the same location on said disks.

4. The process according to claim 3 including the step of:
   providing swap files on said disks for temporarily holding files being swapped.

5. The process according to claim 1 including the step of:
   allocating duplicate locations on each of said disks for said replicated files.

6. The process according to claim 1 including the steps of:
   a) dividing said non-replicated files into even sectors with the number of said sectors being an even multiple of said N disks; and
   b) allocating duplicate locations on each of said disks in said one disk area for every N sectors.

7. A process for compacting scattered contiguous and non-contiguous files in an electronic printing system having a system memory operatively coupled with N disks on which said files are stored, a processor for writing data, represented by electrical signals, from said system memory to said disks, and means for controlling movement of scattered replicated and non-replicated files between said disks, wherein said files are moved from different areas of said disks to a predetermined area of said disks, some of said files comprising system files that are replicated and stored in duplicate on each of said disks to avoid loss in the event of disk failure, with other files comprising non-replicated files that are divided into relatively small file segments, with the number of said file segments being an even multiple of N with every N file segments divided between said disks at the same location, the locations of said files being stored in a first allocation table, comprising the steps of:
   a) building a list of said replicated and non-replicated files stored on said disks by volume;
   b) sorting said files by the disk addresses of said files;
   c) building a temporary volume allocation table in said system memory;
   d) using said temporary allocation table, allocating said contiguous files to a first set of locations in said predetermined area of said disks;
   e) using said temporary allocation table, allocating said non-contiguous files to a second set of locations in said predetermined area of said disks, performing step d) substantially prior to performing step e);
   f) writing a copy of said temporary volume allocation table to one of said disks for updating said allocation table on said disk;
   g) moving said contiguous and non-contiguous files to the first and second sets of locations allocated in said temporary volume allocation table with said controlling means; and
   g) erasing said temporary allocation table from said system memory.

8. The process according to claim 7 including the step of:
   allocating said non-contiguous files so that said non-contiguous file runs are combined to change said non-contiguous files to contiguous files.

9. The process according to claim 7 including the step of:
   moving said files by swapping files currently in said one area of said disks with files allocated to the same location on said disks.

10. The process according to claim 9 including the step of:
    providing swap files on said disks for temporarily holding files being swapped.

11. The process according to claim 7 including the step of:
    allocating duplicate locations on each of said disks for said replicated files.

* * * * *